United States Patent
Wong et al.

(10) Patent No.: US 11,056,685 B2
(45) Date of Patent: Jul. 6, 2021

(54) "FLOWER-LIKE" $LI_4TI_5O_{12}$-MULTIWALLED CARBON NANOTUBE COMPOSITE STRUCTURES WITH PERFORMANCE AS HIGHRATE ANODE-MATERIALS FOR LI-ION BATTERY APPLICATIONS AND METHODS OF SYNTHESIS THEREOF

(71) Applicant: The Research Foundation for The State University of New York, Albany, NY (US)

(72) Inventors: Stanislaus Wong, Upton, NY (US); Lei Wang, Port Jefferson, NY (US); Coray McBean, Malverne, NY (US); Amy C. Marschilok, Stony Brook, NY (US); Kenneth Takeuchi, Stony Brook, NY (US); Esther S. Takeuchi, Stony Brook, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 0 days.

(21) Appl. No.: 16/250,907

(22) Filed: Jan. 17, 2019

(65) Prior Publication Data
US 2019/0260016 A1    Aug. 22, 2019

Related U.S. Application Data

(60) Provisional application No. 62/618,248, filed on Jan. 17, 2018.

(51) Int. Cl.
*H01M 4/36* (2006.01)
*H01M 10/0525* (2010.01)
*H01M 4/52* (2010.01)
*H01M 4/587* (2010.01)
(Continued)

(52) U.S. Cl.
CPC .......... *H01M 4/364* (2013.01); *H01M 4/366* (2013.01); *H01M 4/485* (2013.01); *H01M 4/523* (2013.01);
(Continued)

(58) Field of Classification Search
CPC ...... H01M 4/364; H01M 4/366; H01M 4/485; H01M 4/523; H01M 4/587; H01M 10/0525; H01M 2004/021; H01M 2004/027
See application file for complete search history.

(56) References Cited

U.S. PATENT DOCUMENTS

| | | | |
|---|---|---|---|
| 8,834,746 B1* | 9/2014 | Stachowiak | H01B 1/24 252/502 |
| 2005/0022726 A1* | 2/2005 | Wong | C01B 32/168 117/105 |
| 2009/0020924 A1* | 1/2009 | Lin | B81C 1/00031 264/605 |

FOREIGN PATENT DOCUMENTS

CN         104377345 A    *    2/2015

OTHER PUBLICATIONS

Wang et al., "Enhanced Performance of "Flower-like" Li4Ti5O12 Motifs as Anode Materials for High-Rate Lithium-Ion Batteries", 2015, ChemSusChem, 8, p. 3304-3313 (Year: 2015).*
(Continued)

*Primary Examiner* — Katherine A Bareford
*Assistant Examiner* — Christina D McClure
(74) *Attorney, Agent, or Firm* — Alan M. Sack; John F. Vodopia; Sack IP Law p.c.

(57) ABSTRACT

A method of fabricating nanocomposite anode material embodying a lithium titanate (LTO)-multi-walled carbon nanotube (MWNT) composite intended for use in a lithium-ion battery includes providing multi-walled carbon nanotube (MWNTs), including nanotube surfaces, onto which func-
(Continued)

tional oxygenated carboxylic acid moieties are arranged, generating 3D flower-like, lithium titanate (LTO) microspheres, including thin nanosheets and anchoring the acid-functionalized MWNTs onto surfaces of the 3D LTO microspheres by π-π interaction strategy to realize the nanocomposite anode material.

12 Claims, 9 Drawing Sheets

(51) Int. Cl.
 *H01M 4/485* (2010.01)
 *H01M 4/02* (2006.01)
(52) U.S. Cl.
 CPC ....... *H01M 4/587* (2013.01); *H01M 10/0525* (2013.01); *H01M 2004/021* (2013.01); *H01M 2004/027* (2013.01)

(56) References Cited

OTHER PUBLICATIONS

Wang et al., "Understanding the Effect of Preparative Approaches in the Formation of "Flower-like" Li4Ti5O12—Multiwalled Carbon Nanotube Composite Motifs with Performance as High-Rate Anode Materials for Li-Ion Battery Applications", 2017, ECS, 164, p. A524-A534 (Year: 2017).*

Huang et al., "The preparation and characterization of Li4Ti5O12/carbon nano-tubes for lithium ion battery", 2008, Electrochimica Acta, 53, p. 7756-7759 (Year: 2008).*

Zhao, CN-104377345-A, machine translation, originally published 2015, p. 1-14 (Year: 2015).*

* cited by examiner

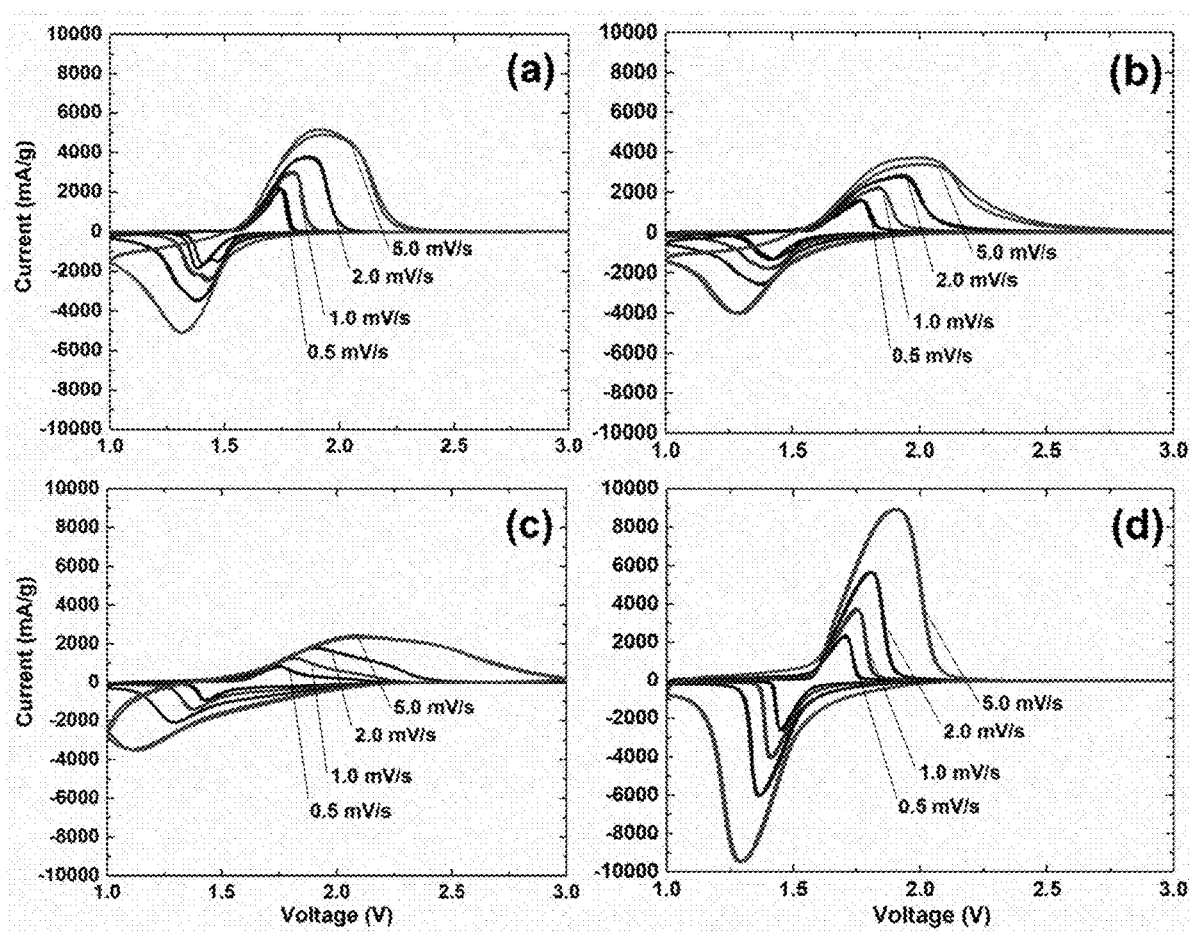
Figs. 7a-d

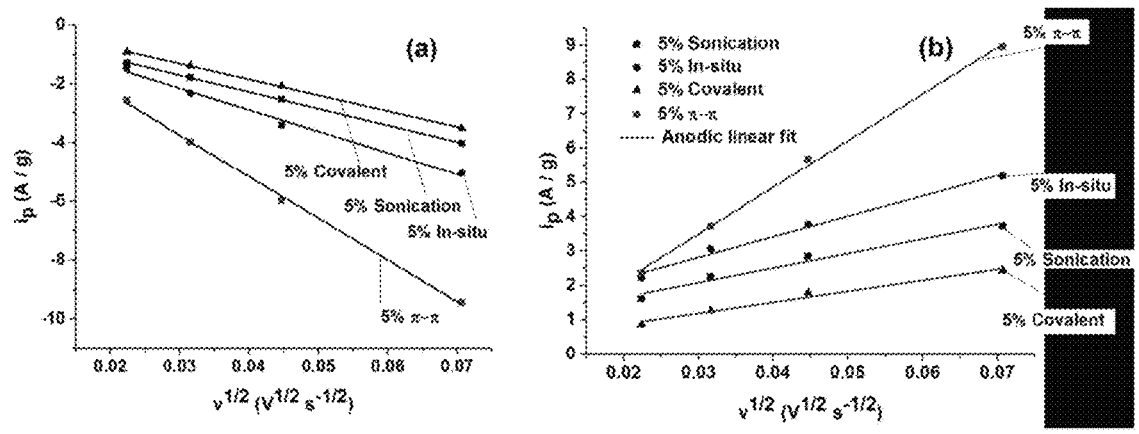
Figs. 8a and 8b
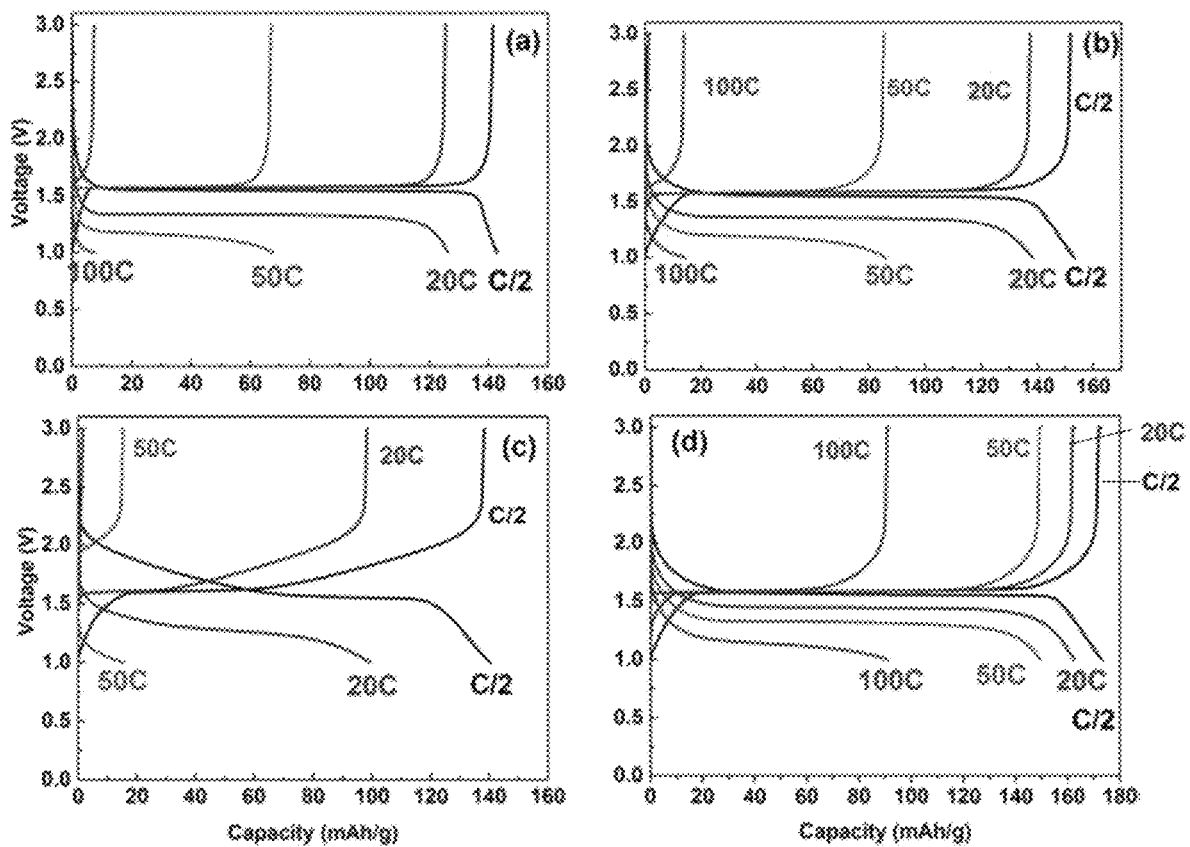
Figs. 9a-d

"FLOWER-LIKE" Li$_4$Ti$_5$O$_{12}$-MULTIWALLED CARBON NANOTUBE COMPOSITE STRUCTURES WITH PERFORMANCE AS HIGHRATE ANODE-MATERIALS FOR LI-ION BATTERY APPLICATIONS AND METHODS OF SYNTHESIS THEREOF

CROSS-REFERENCE TO RELATED APPLICATIONS

This application derives the benefit of the filing date of U.S. Provisional Patent Application No. 62/618,248, filed Jan. 17, 2018. The contents of the provisional application are incorporated herein by reference.

GOVERNMENT SUPPORT STATEMENT

This invention was made with government support under DE-SC0012673 awarded by the US Department of Energy. The government has certain rights in the invention.

BACKGROUND OF THE INVENTION

The invention broadly relates to lithium-ion batteries, and more particularly relates to a method for fabricating a nanocomposite anode material, comprising a lithium titanate (LTO)-multi-walled carbon nanotube (MWNT) composite structures, the method including providing acid functionalized multi-walled carbon nanotube (MWNTs), generating 3D flower-like, lithium titanate (LTO) microspheres and anchoring the acid-functionalized MWNTs onto surfaces of the 3D LTO microspheres by $\pi$-$\pi$ interaction process to synthesize the nanocomposite anode material.

BACKGROUND OF THE RELATED ART

One of the key goals of sustainability is to create reliable, efficient, and cost-effective alternatives for fueling and powering conventional devices. To that end, the development of Li-ion batteries (LIB s) possessing high rate performance, superior durability and desirable environmental sustainability is critical to advancing applications ranging from smart electronics to electric vehicles. C. F. Lin, X. Y. Fan, Y. L. Xin, F. Q. Cheng, M. O. Lai, H. H. Zhou, and L. Lu, J. Mater. Chem. A, 2, 9982 (2014); J. Guo, W. Zuo, Y. Cai, S. Chen, S. Zhang, and J. Liu, J. Mater. Chem. A, 3, 4938 (2015); Y. Sha, B. Zhao, R. Ran, R. Cai, and Z. Shao, J. Mater. Chem. A, 1, 13233 (2013). Conventional LIBs associated with graphite anode materials may suffer from lithium deposition on the anode surface, leading to poor cycling stability. G. N. Zhu, Y. G. Wang, and Y. Y. Xia, Energy Environ. Sci., 5, 6652 (2012); Y. F. Tang, L. Yang, S. H. Fang, and Z. Qiu, Electrochim. Acta, 54, 6244 (2009); J. L. Qiao, Y. Y. Liu, F. Hong, and J. J. Zhang, Chem. Soc. Rev., 43, 631 (2014).

Consequently, spinel Li$_4$Ti$_5$O$_{12}$, also referred to as lithium titanate (LTO), has been proposed and investigated as an alternative anode material. LTO material has known advantages including: (i) a high and stable potential plateau value (i.e. 1.55 V versus Li/Li$^+$). This avoids the formation of lithium dendrites and mitigates the formation of the solid-electrolyte-interphase via electrolyte reduction. LTO material displays (ii) excellent durability over an extended cycle life due to a negligible volume change during electrochemical cycling as well as (iii) a high thermal stability, potentially enabling their use at elevated temperatures. G. N. Zhu, Y. G. Wang, and Y. Y. Xia, Energy Environ. Sci., 5, 6652 (2012); J.-H. Choi, W.-H. Ryu, K. Park, J.-D. Jo, S.-M. Jo, D.-S. Lim, and I.-D. Kim, Sci. Rep., 4, 7334 (2014).

Known prior art methods for fabricating LTO material for anode use, however, are not found to overcome the low conductivity ($<10^{-13}$ S cm$^{-1}$) inherent in utilizing bulk LTO material for same, or the inherently moderate lithium ion diffusion coefficient ($10^{-9}$-$10^{-13}$ cm$^2$ s$^{-1}$) associated therewith. G. N. Zhu, Y. G. Wang, and Y. Y. Xia, Energy Environ. Sci., 5, 6652 (2012); S. Kim, S. H. Fang, Z. X. Zhang, J. Z. Chen, L. Yang, J. E. Penner-Hahn, and A. Deb, J. Power Sources, 268, 294 (2014); H. F. Ni and L. Z. Fan, J. Power Sources, 214, 195 (2012).

One known approach for ameliorating rate performance of LTO electrodes included designing unique nanostructure motifs of LTO in an attempt to enhance the respective composite structure's electronic and Li-ion conductivity. This was conducted within a context of zero-dimensional (0D) nanoparticles, J. Lim, E. Choi, V. Mathew, D. Kim, D. Ahn, J. Gim, S. H. Kang, and J. Kim, J. Electrochem. Soc., 158, A275 (2011); L. Sun, J. P. Wang, K. L. Jiang, and S. S. Fan, J. Power Sources, 248, 265 (2014), one-dimensional (1D) nanowires and nanotubes, L. F. Shen, E. Uchaker, X. G. Zhang, and G. Z. Cao, Adv. Mater., 24, 6502 (2012); J. Liu, K. P. Song, P. A. van Aken, J. Maier, and Y. Yu, Nano Lett., 14, 2597 (2014), and three-dimensional (3D) structural architectures. J. Z. Chen, L. Yang, S. H. Fang, and Y. F. Tang, Electrochim. Acta, 55, 6596 (2010); D. Kong, W. Ren, Y. Luo, Y. Yang, and C. Cheng, J. Mater. Chem. A, 2, 20221 (2014). Relatedly, the inventor(s) successfully generated 'flower-like' LTO microspheres, consisting of thin, sawtooth shaped constituent nanosheets synthesized by (i) a facile and large-scale hydrothermal process involving recyclable precursors followed by (ii) a short, relatively low-temperature calcination process in air. The thin nanosheets gave rise to shortened Li-ion diffusion distances and enhanced contact area with electrolyte, while the micron-scale spherical assemblies themselves possessed thermodynamic stability and high tap density. See, J. Z. Chen, L. Yang, S. H. Fang, and Y. F. Tang, Electrochim. Acta, 55, 6596 (2010); H. Xia, Z. T. Luo, and J. P. Xie, Nanotechnol. Rev., 3, 161 (2014). Also see, D. Kong, W. Ren, Y. Luo, Y. Yang, and C. Cheng, J. Mater. Chem. A, 2, 20221 (2014).

Electrodes made with the LTO microspheres were tested and found to exhibit excellent rate capabilities and stable cycling performance, delivering, as an example, as much as 137 mAh g$^{-1}$ with a capacity retention of about 87% at a discharge rate of 20 C from cycles 101 to 300. It is well known in the field that a C rate is a measure of the rate at which a battery is (dis)charged relative to its theoretical capacity, where the higher the C rate, the faster the rate of (dis)charge (i.e. 1C=1 hour rate, 5C=⅕=0.2 hour rate, C/20=20 hour rate). L. Wang, Y. M. Zhang, M. E. Scofield, S. Y. Yue, C. McBean, A. C. Marschilok, K. J. Takeuchi, E. S. Takeuchi, and S. S. Wong, ChemSusChem, 8, 3304 (2015).

Another known approach to enhance the electronic conductivity between the LTO anode material and the current collector (for Li-ion battery use) by mediating a conductive coating onto an underlying LTO surface, for example, of carbon nanotubes. H. F. Ni and L. Z. Fan, J. Power Sources, 214, 195 (2012); L. Shen, X. Zhang, E. Uchaker, C. Yuan, and G. Cao, Adv. Energy Mater., 2, 691 (2012); G. B. Xu, W. Li, L. W. Yang, X. L. Wei, J. W. Ding, J. X. Zhong, and P. K. Chu, J. Power Sources, 276, 247 (2015).

Carbon nanotubes (CNTs) are allotropes of carbon with a cylindrical nanostructure and are known to display exceptional electrical conductivity and outstanding mechanical strength in part due to their anisotropic structure, and represent a promising conductive additive for improving rate capabilities of LTO composites; J.-H. Choi, W.-H. Ryu, K. Park, J.-D. Jo, S.-M. Jo, D.-S. Lim, and I.-D. Kim, Sci. Rep., 4, 7334 (2014); W. D. Zhang, B. Xu, and L. C. Jiang, J. Mater. Chem., 20, 6383 (2010); A. Marschilok, C. Y. Lee, A. Subramanian, K. J. Takeuchi, and E. S. Takeuchi, Energy Environ. Sci., 4, 2943 (2011).

Research shows that CNTs can be incorporated within the context of 0D, 1D, and 2D LTO-based anode materials, respectively, using either physical mixing or in situ deposition methods. J. J. Huang and Z. Y. Jiang, Electrochim. Acta, 53, 7756 (2008); Y. R. Jhan and J. G. Duh, J. Power Sources, 198, 294 (2012); X. L. Jia, Y. F. Kan, X. Zhu, G. Q. Ning, Y. F. Lu, and F. Wei, Nano Energy, 10, 344 (2014); H. K. Kim, K. C. Roh, K. Kang, and K. B. Kim, RSC Adv., 3, 14267 (2013); J. Shu, L. Hou, R. Ma, M. Shui, L. Y. Shao, D. J. Wang, Y. L. Ren, and W. D. Zheng, RSC Adv., 2, 10306 (2012); P. Zhang, M. Chen, X. Shen, Q. Wu, X. Zhang, L. Huan, and G. Diao, Electrochim. Acta, 204, 92 (2016). These methods rely on physical contact between the LTO and CNT, which is typically a weak attachment mode.

Representative examples of these varied efforts are now presented. For example, Fang, et al., prepared LTO/CNT-based composites by physically mixing, by ball milling, to embed submicron LTO particles within a network of conductive MWNTs. The resulting composite was delivered ~100 mAh/g at a 30C discharge rate. W. Fang, P. J. Zuo, Y. L. Ma, X. Q. Cheng, L. X. Liao, and G. P. Yin, Electrochim. Acta, 94, 294 (2013).

Ni, et al. reported on the use of CNTs to which LTO nanoparticles had been immobilized by liquid phase deposition as a composite anode material for high rate LIBs. These materials delivered ~90 mAh/g at a 30C discharge rate.

Shen, et al., were grew LTO sheathes with a measured thickness of approximately 25 nm on the exterior of a MWNT core which delivered ~90 mAh/g at a 40C discharge rate. L. F. Shen, C. Z. Yuan, H. J. Luo, X. G. Zhang, K. Xu, and F. Zhang, J. Mater. Chem., 21, 761 (2011).

Zhang et al. recently fabricated LTO nanosheet/CNT composites, yielding 145 mAh $g^1$ and 118 mAh $g^{-1}$ at discharge rates of 11 C and 23 C, respectively. P. Zhang, M. Chen, X. Shen, Q. Wu, X. Zhang, L. Huan, and G. Diao, Electrochim. Acta, 204, 92 (2016).

Considering the studies described above, better rate performance is needed for high performance battery and cell anodes. Therefore, an improved method of attaching the LTO to the CNT is desired.

SUMMARY OF THE INVENTION

The invention provides a method for synthesizing a nanocomposite anode material for lithium ion batteries that overcomes the shortcomings of the prior art.

The invention comprises a process (method) for synthesizing composite structures, i.e. "motifs", formed of a "flower-like" $Li_4Ti_5O_{12}$ (lithium titanate or LTO) multi-walled carbon nanotubes (MWNTs) for use as high-rate anode materials for Li-ion battery applications. The invention further includes an anode material fabricated by the process (method) and a lithium-ion battery formed with same.

The anode material fabricated by the inventive process comprises a 3D hierarchical flower-like lithium titanate-multiwalled carbon nanotubes (LTO-MWNT) composite structures, which allows for precise tuning and optimizing the nature of the interactions between of 3D LTO microspheres with the underlying MWNTs, within an MWNT framework.

As will be explained in greater detail herein, nanoscale attachment modality is a significant as it is an important determinant of observed electrochemical performance. Specifically, the invention relies upon controlled loading ratios of multi-walled carbon nanotubes (MWNTs) to successfully anchor onto the surfaces of a unique "flower-like" $Li_4Ti_5O_{12}$ (LTO) microscale sphere structure using a number of different and distinctive preparative approaches, including (i) a sonication method, (ii) an in situ direct-deposition approach, (iii) a covalent attachment protocol, and (iv) a π-π interaction strategy.

As known, a hybrid composite possesses a number of 'structural design' advantages that can assist in improving a measured anode performance. To fabricate the 3D hierarchical flower-like lithium titanate-multiwalled carbon nanotube (LTO-MWNT) composite structure, thin constituent nanosheets within the flower-like LTO micron-scale spheres are first provided for a reduced lithium ion diffusion distance. N. Li, T. Mei, Y. Zhu, L. Wang, J. Liang, X. Zhang, Y. Qian, and K. Tang, Cryst Eng-Comm, 14, 6435 (2012); Y. Tang, F. Huang, W. Zhao, Z. Liu, and D. Wan, J. Mater. Chem., 22, 11257 (2012).

The numerous roughened surfaces of the thin, petal-like nanosheets, associated with a high surface area, represent potentially favorable active sites for the interaction of the electrolyte with LTO, thereby ultimately providing for improved voltage profiles and charge/discharge dynamics. Then, the MWNTs or MWNT network provide for viable electrical pathways to the LTO flower-like structure from the current collector, and increase the mechanical stability of the underlying electrode through the interweaving of the electrode components. J.-H. Choi, W.-H. Ryu, K. Park, J.-D. Jo, S.-M. Jo, D.-S. Lim, and I.-D. Kim, Sci. Rep., 4, 7334 (2014).

While prior art efforts to generate MWNT-LTO nanocomposites to enhance electrode performance, few if any efforts are known that primarily focus on chemically controlling and improving upon the ion transport between the constituent LTO motifs and the adjoining CNTs, i.e., systematically engineering the nature of the molecular junction between these two species through judiciously chosen attachment strategies.

BRIEF DESCRIPTION OF THE DRAWINGS

Further features and advantages of the invention will become apparent from the description of embodiments that follows, with reference to the attached figures, in which:

FIG. 7a depicts a voltammograms of the 5% in situ sample, revealing reversible electrochemistry at all scan rates wherein clear anodic and cathodic peaks were apparent;

FIG. 7b depicts the 5% physically sonicated LTO-MWNT sample demonstrated A-Epeak values of 0.36, 0.44, 0.56, and 0.70 V at scan rates of 0.5, 1.0, 2.0, and 5.0 mV/s, respectively;

FIG. 7C depicts A-Epeak values of 0.32, 0.44, 0.62, and 0.93 V at scan rates of 0.5, 1.0, 2.0, and 5.0 mV/s, respectively, for the 5% covalent LTO-MWNT sample;

FIG. 7d depicts A-Epeak values of 0.25, 0.35, 0.45, and 0.61 V at scan rates of 0.5, 1.0, 2.0, and 5.0 mV/s, respectively, for the LTO-MWNT composite prepared through π-π interactions;

FIG. 8a presents fits of the cyclic voltammetry (CV) data to the Randles-Sevcik equation, plots of $i_p$ as a function of square root of the scan rate for cathodic peaks;

FIG. 8b presents fits of the CV data to the Randles-Sevcik equation, plots of $i_p$ as a function of square root of the scan rate for anodic peaks;

FIG. 9a depicts discharge and charge voltage curves for Lithium/LTO-MWNT electrochemical cells, at cycle 20 (C/2 rate), 25 (20 C rate), 30 (50 C rate), 35 (100 C rate), comprising active material generated using a 5% MWNT loading amount with in situ method;

FIG. 9b depicts discharge and charge voltage curves for Lithium/LTO-MWNT electrochemical cells at cycle 20 (C/2 rate), 25 (20 C rate), 30 (50 C rate), 35 (100 C rate), comprising active material fabricated using a 5% MWNT loading amount with the physical sonication protocol;

FIG. 9c depicts discharge and charge voltage curves for Lithium/LTO-MWNT electrochemical cells at cycle 20 (C/2 rate), 25 (20 C rate), 30 (50 C rate), 35 (100 C rate), comprising active material produced using a 5% MWNT loading amount with covalent attachment;

FIG. 9d depicts discharge and charge voltage curves for Lithium/LTO-MWNT electrochemical cells at cycle 20 (C/2 rate), 25 (20 C rate), 30 (50 C rate), 35 (100 C rate), comprising active material generated using a 5% MWNT loading amount synthesized through π-π interactions;

DETAILED DESCRIPTION OF THE INVENTION

Figure 1:
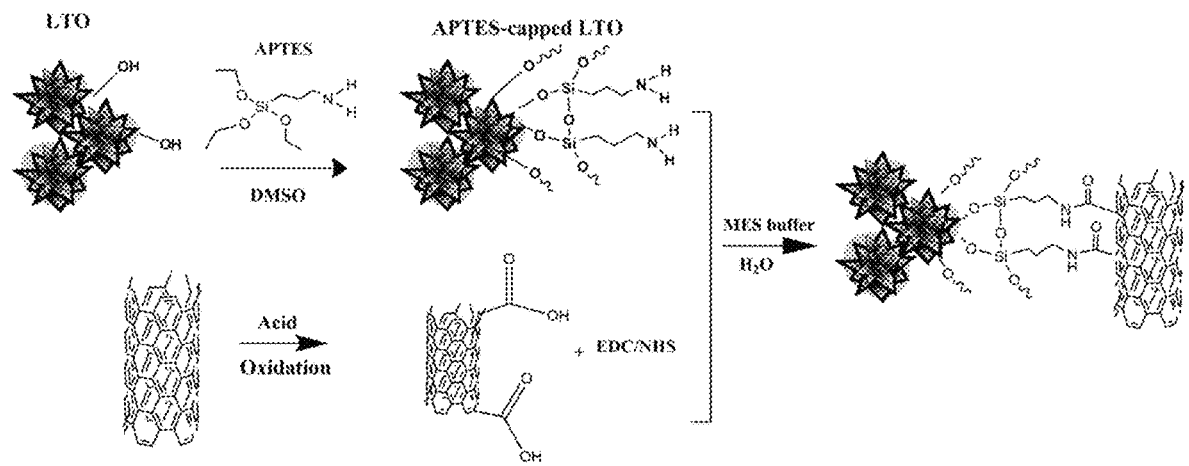
FIG. 1 is a reaction schematic denoting the covalent attachment process between "flower shape" LTO micron-scale spheres and adjoining MWNTs.

The following detailed description of embodiments of the invention will be made in reference to the accompanying drawings. In describing the invention, explanation about related functions or constructions known in the art are omitted for the sake of clarity in understanding the concept of the invention to avoid obscuring the invention with unnecessary detail.

In separate experiments, the inventors embedded 3D LTO micro spheres into the MWTNs (i.e., MWNT networks) through (i) physical sonication, (ii) direct in situ deposition, (iii) covalent attachment, and (iv) simple, π-π interaction strategies.

It should be noted that incorporation of various linkers as connective, mediating 'bridges' between LTO and MWNTs with the goal of enhancing electrode performance for methods (iii) and (iv) are heretobefore unknown with prior LTO-MWNT composite formation. The above-mentioned experiments sought to correlate the electrochemical performances of these individual distinctive LTO-MWNT composites with their specific attachment strategy, i.e. with the particular preparative treatment process used to generate each of these composite materials.

Inventive composites generated by physical sonication as well as π-π interactions retain the intrinsic hierarchical "flower-like" morphology and exhibit a similar crystallinity profile as compared with that of pure LTO.

Inventive composites prepared by in situ direct deposition yielded a fragmented LTO structure (likely due to the possible interfering presence of the MWNTs themselves during the relevant hydrothermal reaction) and a larger crystallite size, owing to the higher annealing temperature associated with its preparation.

Inventive composites created via covalent attachment was covered with an amorphous insulating linker, which probably led to a decreased contact area between the LTO and the MWNTs and hence, a lower crystallinity in the resulting composite.

Inventive composites generated by π-π interactions outperformed the other three analogous heterostructures, i.e., those formed by physical sonication, in situ direct deposition and covalent attachment, were found (through electrode testing), due to a smaller charge transfer resistance as well as a faster Li-ion diffusion. The inventive LTO-MWNT composite (material), produced by π-π interactions, exhibits a reproducibly high rate capability as well as a reliably solid cycling stability, delivering 132 mAh g$^{-1}$ at 50 C, after 100 discharge/charge cycles, including 40 cycles at a high (>20 C) rate. Such data denote the highest electrochemical performance measured to date as compared with any LTO-carbon nanotube-based composite materials previously reported, under high discharge rate conditions. The data tangibly underscore the correlation between preparative methodology and the resulting performance metrics.

The experimental testing verified successful synthesis of the "flower-like" LTO-MWNT composites systematically fabricated via different preparative approaches, including (i) physical sonication, (ii) an in situ direct deposition approach, (iii) a covalent chemical attachment protocol, as well as (iv) a π-π interaction strategy. Data derived from a structural characterization analysis suggest that the composites generated by both the physical sonication and π-π interaction methods retain not only the favorably small crystallite size (i.e. 12.6 nm) of the pure LTO but also the intrinsic "flower-like" morphology ascribed to pure LTO, both during and after the preparative process.

By contrast, the data show that composite prepared through an in situ direct-deposition approach yields fragmented LTO structures, possibly due to curtailed crystal growth induced by the presence of interfering MWNTs, but also larger overall crystallite sizes likely resulting from the higher annealing temperatures used, denoting factors which contributed to the lower electrochemical performance measured. Rietveld refinement results suggest the existence of the rutile and anatase TiO$_2$ impurities within the composite, which were detected in the CV peaks. Rietveld refinement is a method well known in the field for phase composition analysis and determining crystal structure refinements based on powder diffraction data. Finally, the composite produced via covalent attachment appeared to be enveloped with a coating of amorphous linker molecules, thereby leading to not only lower overall crystallinity but also a decreased contact area between LTO and MWNTs, thereby giving rise to poorer performance.

The electrochemical performance of these composite materials was correlated with their corresponding attachment chemistry. For example, an LTO sample with the 5% MWNT loading prepared via the π-π interaction method evidenced the highest delivered discharge capacity at every C rate. It is well known in the field that a C-rate is a measure of the rate at which a battery is (dis)charged relative to its theoretical capacity, where the higher the C rate, the faster the rate of (dis)charge (i.e. 1C=1 hour rate=60 minute discharge, 5C=⅕=0.2 hour rate=12 minute discharge, C/20=20 hour rate=120 minute discharge) from C/2 to 100C, with the most notable differences apparent under discharge rates ≥20 C, due to a much lower charge transfer resistance as compared with those of the other LTO-MWNT composites analyzed. These LTO-MWNT composites, produced by π-π interactions, exhibited a reproducibly high rate capability and a desirable cycling stability, i.e., delivering 174 mAh g-1 at C/2 with a 99% capacity retention from cycles 20-90, 163 mAh g-1 at 20 C with a 97% capacity retention from cycles 25-95, and 146 mAh/g at 50 C with a 90% capacity retention from cycles 30-100.

These observed parameters denote clearly superior performance to those of any previously reported LTO-carbon nanotube composite materials, to date, especially under these relatively low loading conditions. Notably, the LTO-MWNT samples prepared via the covalent attachment scheme delivered a lower capacity and displayed 97% capacity retention from cycle 20 to cycle 90 at C/2 rate as compared with the higher capacity and 99% capacity retention for the set of physically sonicated, in situ, and π-π interaction samples. The voltammetric and galvanostatic data coupled with the impedance results indicate slower kinetics for the LTO-MWNT heterostructures, prepared using the covalent attachment approach, suggests that increased charge transfer resistance was found to have been associated with a covalent coupling protocol involving the 3-aminopropyltriethoxysilane (APTES) linker.

Examples

Functionalization of MWNTs—
Pristine MWNTs (SES Research, 95% nanotubes and 2% amorphous carbons) were initially dispersed in concentrated HNO3 (Sigma-Aldrich, 70%) by sonication and further refluxing at 120° C. for 4 h in order to (a) remove any remnant metal catalysts and carbonaceous impurities, as well as to (b) generate functional, oxygenated carboxylic acid moieties onto the nanotube surfaces. The resulting purified and oxidized MWNTs, possessing a diameter range of 10 to 30 nm, were filtered through a 200 nm pore diameter polycarbonate membrane (Millipore), thoroughly washed with excess water, and dried at 80° C. for 18 h.

Synthesis of 'Flower-Like' LTO Micron-Scale Spheres—
Approximately 40 pieces of Ti foil (STREM chemicals, 99.7%), including of 1 cm×1 cm squares, were placed in a 120 mL autoclave and reacted with 86.1 mL of 0.5 M LiOH (Acros Organics™, 98%) and 7.83 mL of 30% (w/w) H$_2$O$_2$ (VWR) aqueous solution, followed by strong stirring at room temperature for 15 min. Afterwards, the as-prepared mixture solution was subsequently heated at 130° C. for 4 h. The resulting suspension and as-formed white precipitate were separated by vacuum filtration, washed with aliquots of deionized water, and ultimately oven dried at 80° C. The final products were annealed at 500° C. in air for 3 h in a muffle furnace in order to obtain 'flower-like' LTO microspheres. As described by L. Wang, Y. M. Zhang, M. E. Scofield, S. Y. Yue, C. McBean, A. C. Marschilok, K. J. Takeuchi, E. S. Takeuchi, and S. S. Wong, ChemSusChem, 8, 3304 (2015).

Synthesis of 'Flower-Like' Li$_4$Ti$_5$O$_{12}$ Micron-Scale Spheres—MWNT Composite Structures—
To demonstrate the chemistry of heterostructure formation, and electrode performance, composite structures were generated by four complementary strategies, namely by means of (1) a physical mixing of preformed structures by sonication; (2) a direct in situ deposition of MWNTs onto the underlying LTO micron-scale spheres within the context of a hydrothermal reaction environment; (3) the covalent attachment of the two constituent components through the mediation of a silane linker molecule; and (4) the formation of π-π interactions stabilized with short-chain, electro active aromatic linker molecules.

Sonication Method.
The acid-functionalized MWNTs were well dispersed in dimethyl sulfoxide (DMSO) by ultrasonication for 1 h in order to obtain a clear black solution. As-prepared LTO micron-scale spheres were sonicated in water for 30 min before being added into the MWNT solution in a drop-wise manner. The mixture solution was further ultra-sonicated for another 1 h. The final product was collected by filtration, washed with deionized water, and dried at 80° C. in order to obtain the resulting LTO-MWNT composites.

In Situ Direct Deposition Approach.
The functionalized MWNTs were added to the autoclave together with the precursors of lithium titanate, namely H$_2$O$_2$, LiOH, and Ti foil, using the same reaction parameters, as previously described. The resulting grey product was further annealed at 600° C. for 3 h under an $N_2$ atmosphere in a tube furnace in order to preserve the underlying structural integrity of MWNTs. L. Wang, Y. M. Zhang, M. E. Scofield, S. Y. Yue, C. McBean, A. C. Marschilok, K. J. Takeuchi, E. S. Takeuchi, and S. S. Wong, ChemSusChem, 8, 3304 (2015).

Covalent Attachment Protocol—

As-prepared LTO micron-scale spheres were initially functionalized with (3-aminopropyl) triethoxysilane (APTES) linker molecules (Acros Organics, 99%) by dispersing them in anhydrous organic DMSO solvent, in order to inhibit the formation of undesirable polysilsesquioxane that normally is generated through the hydrolytic condensation of organosilanes in either water or ethanol-water media. S. Sankaraiah, J. M. Lee, J. H. Kim, and S. W. Choi, Macromolecules, 41, 6195 (2008); I. Noda, T. Kamoto, and M. Yamada, Chem. Mater., 12, 1708 (2000); E. Asenath-Smith and W. Chen, Langmuir, 24, 12405 (2008). The coated LTO sample was subsequently reacted at 85° C. for 18 h under a N2 atmosphere, followed by thermal curing at 120° C. for 24 h in order to generate amine-terminated LTO.

The resulting $NH_2$-terminated LTO product was collected by centrifugation and further washed with DMSO for three times to remove any remaining, free-standing APTES molecules. The acid-functionalized MWNTs were dispersed in a $H_2O$: DMSO mixture (i.e., a 1:2 ratio by volume) by sonication followed by the addition of 1-ethyl-3-(3-dimethylaminopropyl) carbodiimide (EDC) (Sigma-Aldrich, 99.9%), and N-hydroxysuccinimide (NHS) (Sigma-Aldrich, 98%) in order to activate pendant carboxylic acid groups. The APTES-derivatized LTO were dispersed in water and mixed in with the MWNT solution in 2-morpholino-ethanesulfonic acid (MES) (Sigma-Aldrich, 99.5%) buffer solution. The resulting mixture was reacted under vigorous stirring for 24 h. The final product was ultimately filtered, washed with excess deionized water, and finally dried at 80° C. to obtain LTO-MWNT composites. FIG. 1 is a reaction schematic denoting the covalent attachment process between "flower shape" LTO micron-scale spheres and adjoining MWNTS.

π-π Interaction Strategy—

As-synthesized LTO spheres were initially dispersed in an ethanolic solution of 4-mercaptobenzoic acid (4-MBA) (Aldrich, 99%) linker molecules. The mixture was stirred at 60° C. for 18 h in order to create a sample of 4-MBA functionalized LTO, in which the terminal carboxylic acid groups of the ligand are bound onto the Ti sites localized on the LTO surface through either a mono dentate or bidentate coordination mode. A. Raman, R. Quinones, L. Barriger, R. Eastman, A. Parsi, and E. S. Gawalt, Langmuir, 26, 1747 (2010).

Figure 2:
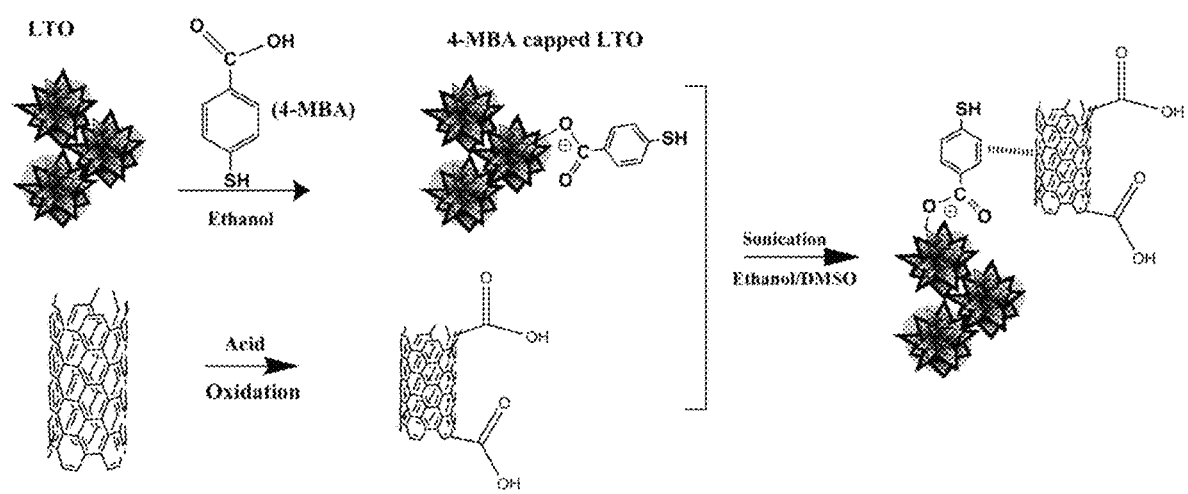
FIG. 2 is a reaction schematic demonstrating the π-π interactions between the "flower shape" LTO micron-scale spheres and adjoining MWNTs.

The molecular-coated LTO product was isolated by vacuum filtration and further washed with ethanol for multiple times to remove any remaining, unbound 4-MBA linkers. Such 4-MBA functionalized LTO micro spheres were subsequently reacted with the oxidized MWNTs, through sonication in a mixture of ethanol and DMSO (in a 3:1 volume ratio) solvents for 2 h, in order to facilitate favorable and stabilizing π-π interactions between the phenyl rings within the aromatic, conjugated linker molecules and the underlying MWNT network. The resulting composites were subsequently vacuum filtered, washed, and ultimately oven dried at 80° C. FIG. 2 is a reaction schematic demonstrating the π-π interactions between the "flower shape" LTO micron-scale spheres and adjoining MWNTS.

In terms of structural-characterization, the composites generated by physical sonication as well as π-π interactions retained the intrinsic hierarchical "flower-like" morphology and exhibited a similar crystallinity profile as compared with that of pure LTO. By comparison, the composite prepared by an in situ direct deposition approach yielded not only a fragmented LTO structure, likely due to the possible interfering presence of the MWNTs themselves during the relevant hydrothermal reaction, but also a larger crystallite size, owing to the higher annealing temperature associated with its preparation. Finally, the composite created via covalent attachment was covered with an amorphous insulating linker, which probably led to a decreased contact area between the LTO and the MWNTs and hence, a lower crystallinity in the resulting composite.

Electrode tests suggested that the composite generated by π-π interactions out-performed the other three analogous heterostructures, due to a smaller charge transfer resistance as well as a faster Li-ion diffusion. In particular, the LTO-MWNT composite, produced by π-π interactions, exhibited a reproducibly high rate capability as well as a reliably solid cycling stability, delivering 132 mAh $g^{-1}$ at 50 C, after 100 discharge/charge cycles, including 40 cycles at a high (>20 C) rate. Such data denote the highest electrochemical performance measured to date as compared with any LTO-carbon nanotube-based composite materials previously reported, under high discharge rate conditions, and tangibly underscore the correlation between preparative methodology and the resulting performance metrics.

Morphology and Structure of the Materials—

Figure 3:
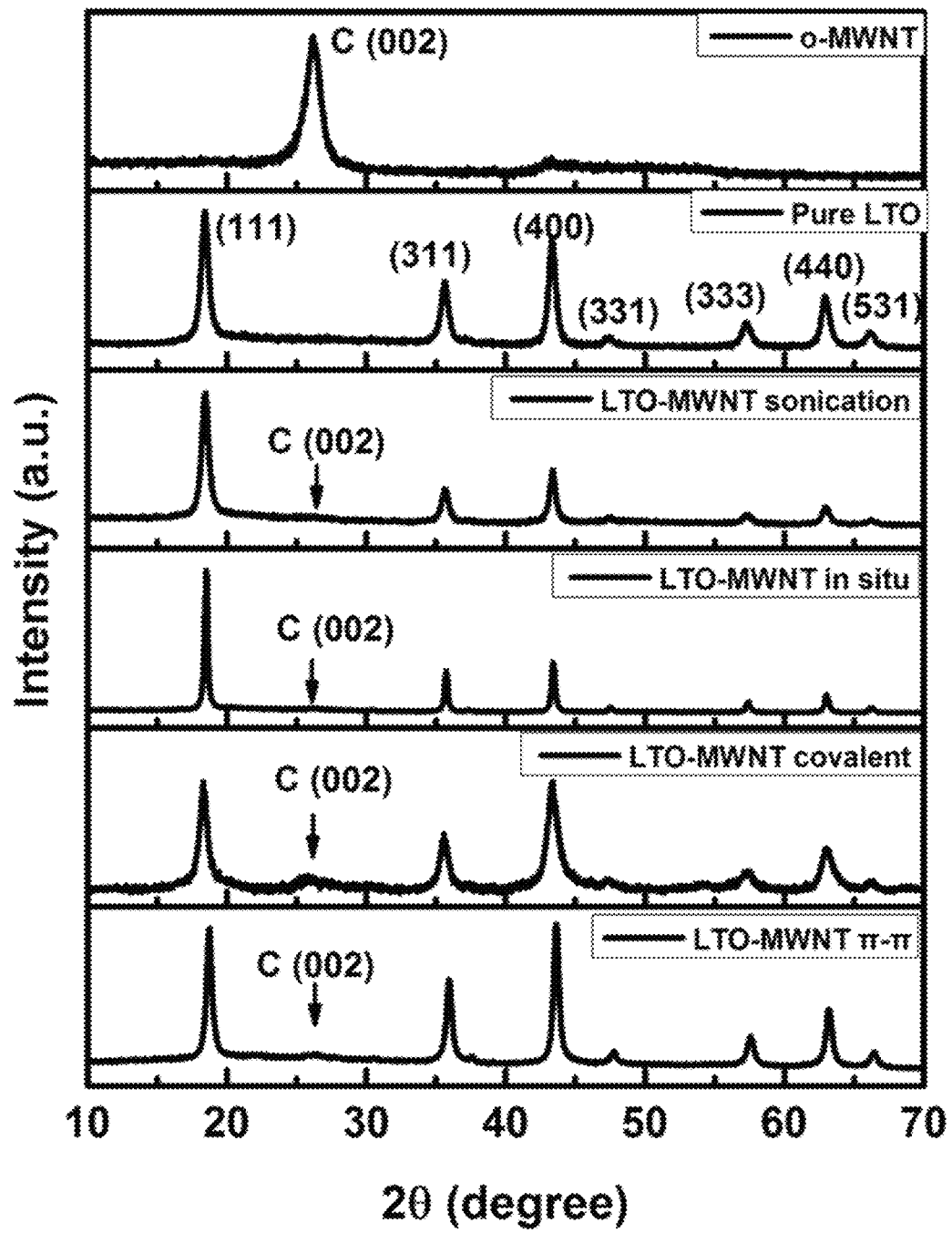
FIG. 3 depicts, top to bottom, XRD patterns associated with (i) the oxidized MWNTs, (ii) pure flower shape LTO motifs, and (iii) the resulting LTO-MWNT composites, generated by sonication, direct in situ, covalent attachment and π-π interaction strategies, respectively.

Typical XRD patterns of (i) MWNTs, (ii) pure "flower-like" LTO micron-scale spheres, and (iii) LTO-MWNT composites, prepared using different synthetic strategies, respectively, as depicted in FIG. 3. The MWNT loading ratio in each composite was confirmed as 5 wt %. The pure LTO can be indexed to the face-centered cubic (fcc) spinel structure of $Li_4Ti_5O_{12}$, where the broadened peaks in the XRD pattern suggest as synthesized LTO possesses a relatively small crystallite size, which is calculated to be about 12.6 nm using the Debye-Scherrer equation. Upon MWNT addition, the diffraction peak positions of the LTO did not change, with the major diffraction peaks located at 2θ values of 18.4°, 35.7°, 43.3°, 47.4°, 57.3°, 62.8°, and 66.2°, which could be ascribed to the (111), (311), (400), (331), (333), (440), and (531) planes, respectively, of a face-centered cubic spinel structure, possessing a Fd-3m space group. A new and reasonably broadened peak centered at 26.2° could be assigned to the (002) lattice plane of the MWNTs, present in the XRD profile of the MWNTs alone, as highlighted in the top panel of FIG. 3. H.-K. Kim, K. C. Roh, K. Kang, and K.-B. Kim, RSC Adv., 3, 14267 (2013).

When comparing these data with pure LTO, the LTO-MWNT formed by both the physical sonication and π-π interaction methods yielded little if any obvious change in the degree of overall crystallinity. In contrast, the LTO-MWNT sample prepared by the in situ deposition protocol, evinced sharper diffraction peaks suggestive of a larger crystallite size possibly due to higher annealing temperatures.

In effect, based upon the Debye-Scherrer equation, the crystallite size derived from the composite prepared by the in situ method was calculated to be 30.0 nm as compared with a 12.6 nm value associated with both pure LTO as well as with the two composites generated by physical sonication and π-π interaction methods. It has been reported that the presence of a larger crystallite size may lead to a reduced rate performance of this composite material as compared with analogous composites possessing a smaller crystallite size. This assertion has been ascribed to the observation that a relatively small crystallite size often favors enhanced rate capabilities and long-term cyclability, because of a combination of not only low charge transfer impedance but also decreased Li$^+$ diffusion impedance. G. Hasegawa, K. Kanamori, T. Kiyomura, H. Kurata, K. Nakanishi, and T. Abe, Adv. Energy Mater., 5, 1400730 (2015); Y. B. Shen, J. R. Eltzholtz, and B. B. Iversen, Chem. Mater., 25, 5023 (2013).

The LTO-MWNT composite prepared by covalent immobilization gave rise to less well-defined XRD peaks and lower signal-to-noise ratios, reflecting a lower degree of crystallinity, which is believed to be attributable to the presence of amorphous APTES linker molecules on the LTO surface. H.-Y. Cheng, L.-J. Lai, and F.-H. Ko, Int. J. Nanomedicine, 7, 2967 (2012). The calculated crystallite size for this covalently formed composite was estimated to be 12.0 nm, similar to that of pure LTO alone, thereby indicating that the APTES functionalization process itself had not altered the apparent crystallinity of LTO itself.

To gain a deeper structural understanding of the various samples formed, Rietveld refinements were conducted and variations in the measured lattice parameter, a, were observed. For example, pure LTO possesses a lattice parameter of 8.35 Å, whereas the LTO-MWNT (5 wt %) composites generated by sonication, direct in situ, covalent attachment, and π-π interaction strategies yielded corresponding lattice parameters of 8.35 Å, 8.36 Å, 8.36 Å, and 8.36 Å, respectively. The composite derived from the direct in situ method in particular contained 0.9% rutile TiO2 and 0.8% anatase TiO2 impurities.

Our pure LTO micron-scale spheres exhibited a hierarchical "flower-shape" structure with an overall diameter of 1 μm. The thin constituent, petallike component nanosheets measured 12.5±2.6 nm in thickness from a TEM image. The morphologies and micron-scale structures of the LTO-MWNT (5 wt %) composites were investigated by TEM and SEM, as presented in FIG. 4. The MWNTs, indicated by arrows, measure 10-30 nm in diameter and are intermingled with the LTO spheres.

The composite generated through a physical sonication method (FIGS. 4A and 4B) evinced the presence of a relatively uniform coverage of evenly distributed MWNTs with no observable morphological change associated with the underlying LTO micron-scale spheres. As for the corresponding composite synthesized by the direct in situ deposition technique, the presence of the MWNTs might have potentially interfered with the growth of the LTO micron-scale spheres themselves during the process of the hydrothermal reaction, since we observed a certain degree of fragmentation, thereby resulting in the formation of 'broken up', particulate LTO structures, possessing an average diameter of 35.2±5.3 nm, as well as individual, dissociated nanosheets, C. F. Lin, X. Y. Fan, Y. L. Xin, F. Q. Cheng, M. O. Lai, H. H. Zhou, and L. Lu, J. Mater. Chem. A, 2, 9982 (2014), as indicated by the white circles in FIGS. 4C and 4D.

Figures 4A, 4B, 4C, 4D, 4E, 4F, 4G, 4H:
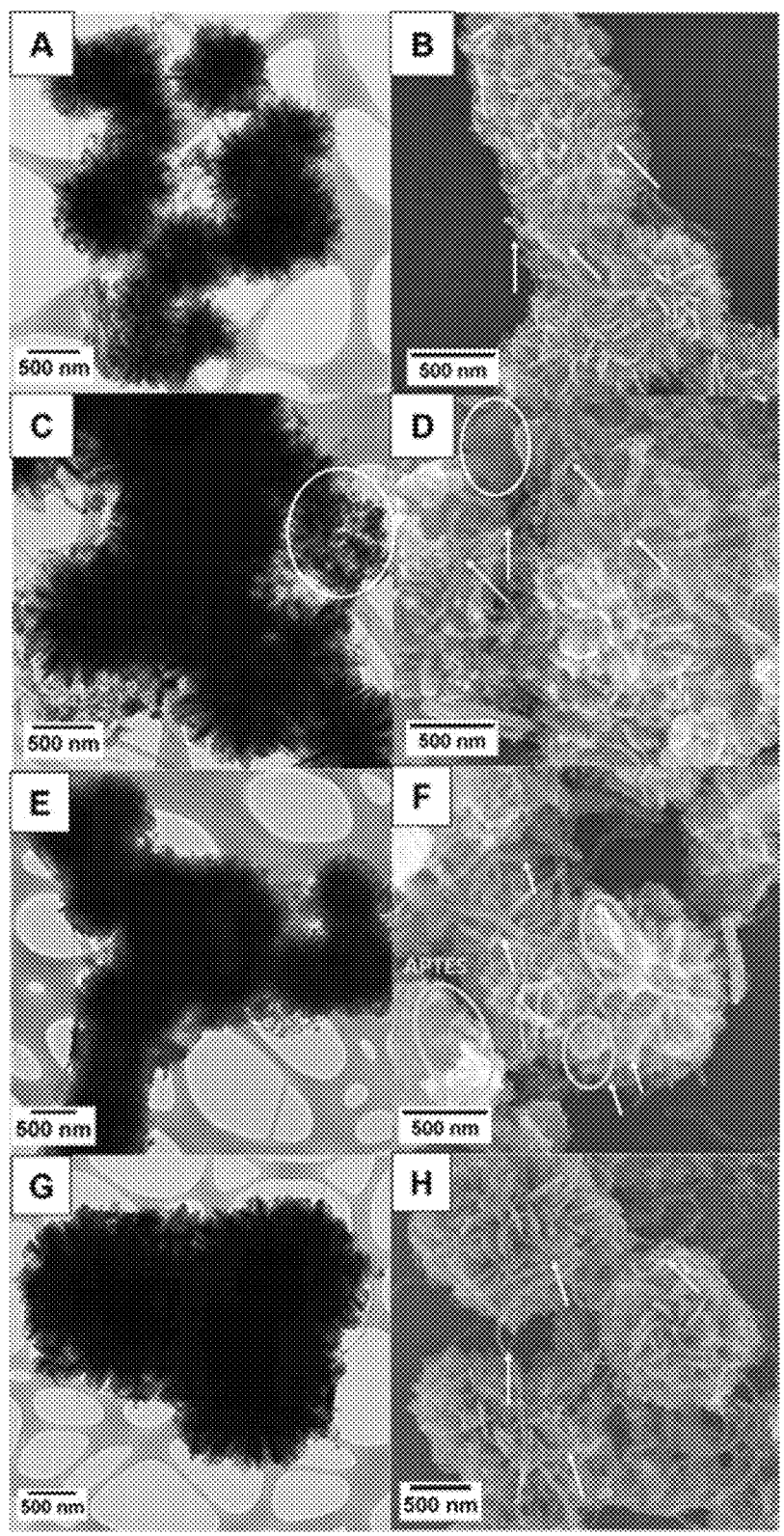
FIG. 4A depicts a TEM image of the LTO-MWNT composite generated by sonication.
FIG. 4B depicts an SEM TEM image of the LTO-MWNT composite generated by sonication.
FIG. 4C depicts a TEM image of the LTO-MWNT composite generated by in situ attachment.
FIG. 4D depicts an SEM TEM image of the LTO-MWNT composite generated by in situ attachment.
FIG. 4E depicts a TEM image of the LTO-MWNT composite generated by covalent attachment.
FIG. 4F depicts an SEM TEM image of the LTO-MWNT composite generated by covalent attachment.
FIG. 4G depicts a TEM image of the LTO-MWNT composite generated by π-π interaction synthesis process.
FIG. 4H depicts an SEM TEM image of the LTO-MWNT composite generated by interaction synthesis process.

By contrast, the inventors noted that the MWNTs appeared to be more uniformly dispersed and distributed throughout the network of LTO micron-scale spheres within the framework of composites generated through a covalent attachment strategy (FIGS. 4E and 4F). However, the occurrence of individual nanosheets themselves became less distinctive, possibly due to the presence of surface capping associated with APTES linker molecules, as indicated by the yellow circles in FIG. 4F. By analogy with the LTO-MWNT composite derived from physical sonication, the composite prepared by π-π interactions (FIGS. 4G and 4H) also evinced a uniform MWNT coverage on the surface with little if any noticeable morphological alteration of the LTO motif.

More detailed structural information was provided by HRTEM images and selected area electron diffraction (SAED) patterns, as shown in FIGS. 5A-5D. In effect, within the HRTEM data, distinctive lattice fringes possessing distances of approximately 4.84 angstroms and 3.41 angstroms were observed, corresponding to the (111) planes of spinel LTO and the interlayer spacings of graphitic layers within the MWNTs themselves, respectively. The corresponding SAED patterns could be indexed to the (111), (311), and (400) lattice planes of spinel LTO as well as the (002) lattice plane of MWNTs, respectively.

Figures 5A, 5B, 5C, 5D:
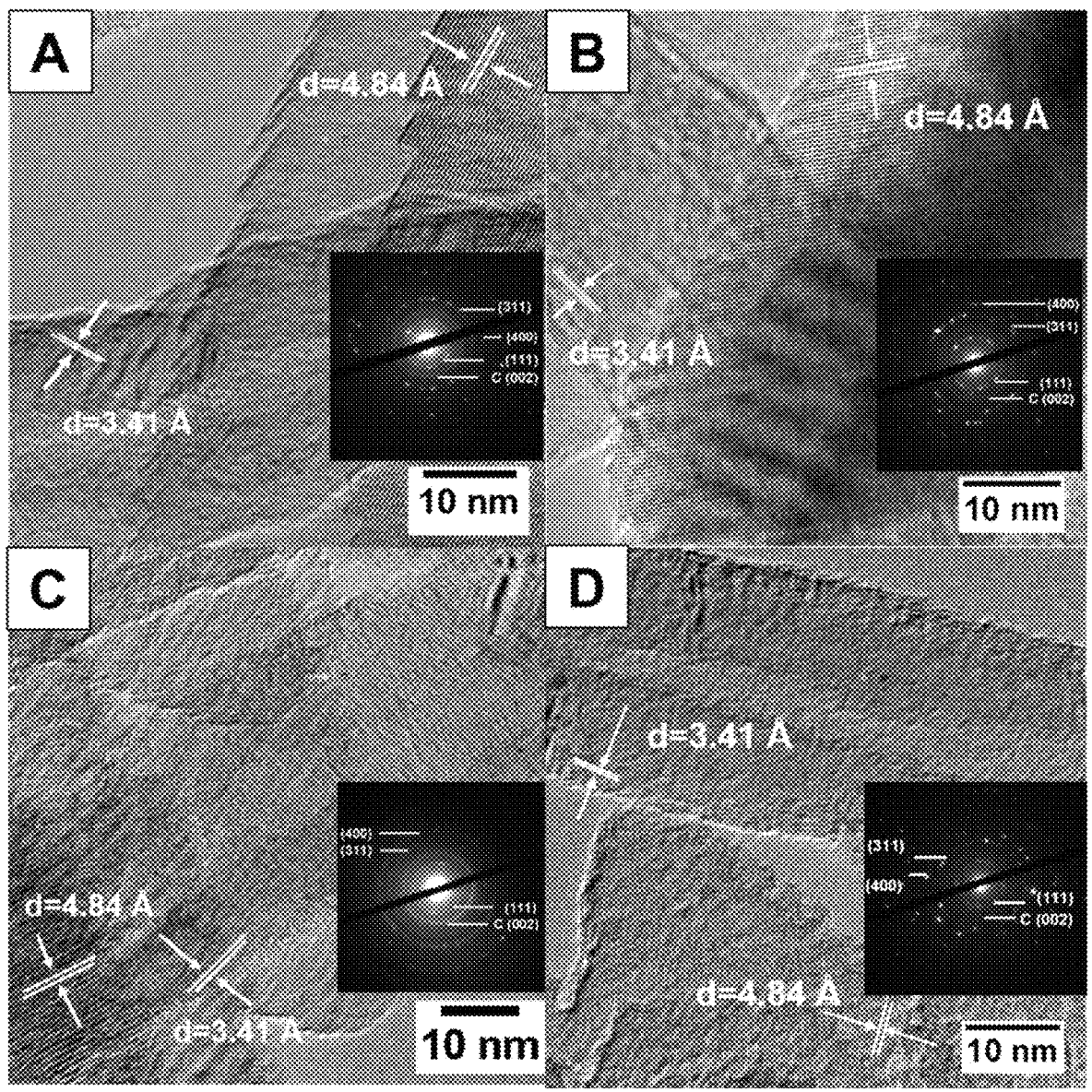
FIG. 5A is an HRTM image and the corresponding insets to the SAED patterns of LTO-MWNT composites generated by A) physical sonication.
FIG. 5B is an HRTM image and the corresponding insets to the SAED patterns of LTO-MWNT composites generated by B) in situ growth.
FIG. 5C is an HRTM image and the corresponding insets to the SAED patterns of LTO-MWNT composites generated by C) covalent attachment.
FIG. 5D is an HRTM image and the corresponding insets to the SAED patterns of LTO-MWNT composites generated by D) π-π interaction strategies.

These data evidence a presence of phase purity, where the MWNTs are in close contact with LTO nanosheets, providing for enhanced transport pathways between adjacent LTO micron-scale spheres. For that matter, FIG. 5C shows the covalently attached composite was less crystalline than for the other 3 as-formed heterostructures (FIGS. 5A, 5B and 5D), an observation that was consistent with the XRD results.

In order to visualize and further reveal structural information at the junctions between the MWNTs and the LTO microspheres, EDS mapping data of the composites variously prepared by the four different attachment modalities studied. The C mapping signals are relatively diffuse in all four samples, due to the presence of a carbon supporting film on the Cu TEM grid. Nonetheless, it is expected that MWNTs and LTO microspheres are in direct contact with each other in samples prepared by both sonication and in situ deposition methods, and not surprisingly, only Ti, O, and C signals can be detected. By contrast, in the sample prepared by the covalent attachment strategy, additional N and Si signals likely stemming from the APTES linker were observed. These signals spatially overlap rather well with the corresponding Ti and O peaks associated with the LTO microspheres, thereby implying a relatively uniform coating of APTES molecules onto the underlying LTO surface. Similarly, mapping results of the S element emanating from the 4-MBA linker coincide closely with those of Ti and O within the sample prepared by π-π interactions. These data likewise unambiguously confirm the expected presence of 4-MBA molecules at the junctions between the LTO and the MWNT, a finding consistent with the sample preparation conditions.

Figure 6:
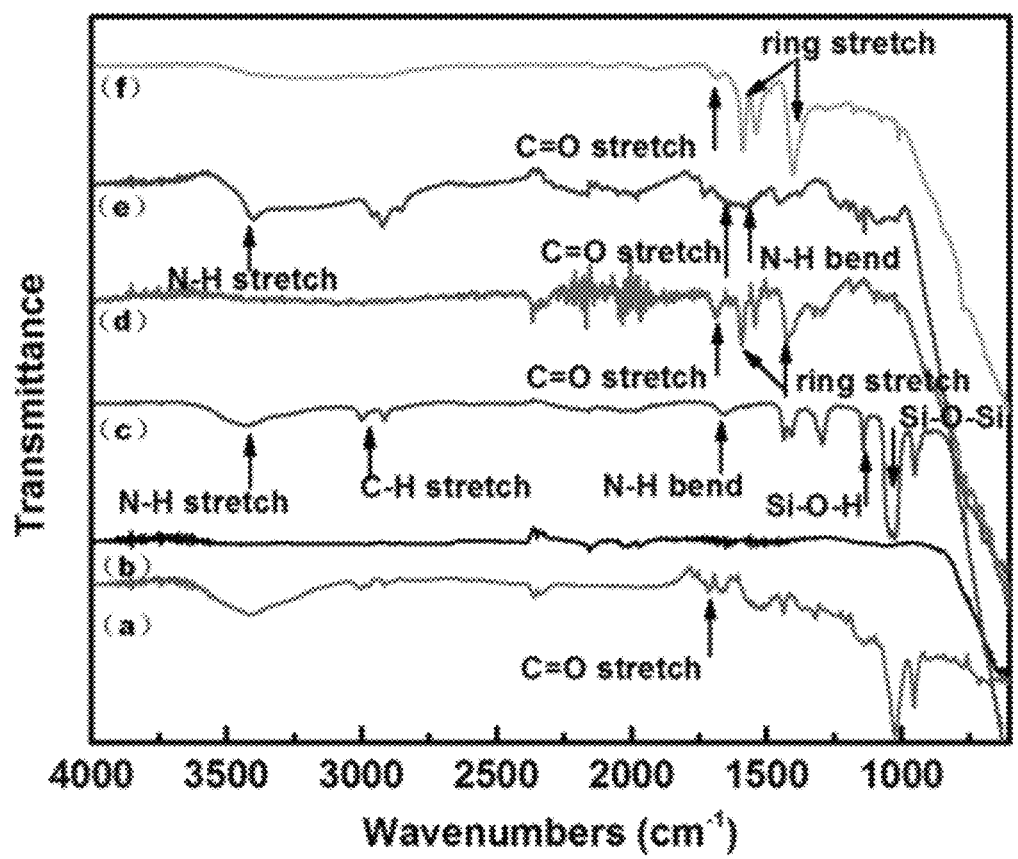
FIG. 6 illustrates IR spectra of (a) oxidized MWNTs, (b) pure LTO, (c) APTES linkers, as well as (d) 4-MBA-functionalized LTO motifs, and associated LTO-MWNT heterostructures, generated not only by a (e) covalent attachment but also (f) π-π interaction strategies.

FT-IR spectroscopy was used to confirm the formation of amide bonds as well as π bonds within the LTO-MWNT composites formed by means of covalent attachment and π-π interactions, respectively. Specifically, spectra of (i) oxidized MWNTs, (ii) pure LTO, (iii) APTES, as well as (iv) 4-MBA-functionalized LTO, together with (v) LTO-MWNT 5 wt % composites, generated by both covalent attachment and π-π interaction methods, are respectively shown in FIGS. 6a-6f. Upon treatment with nitric acid, the peaks located at 1720 cm-1 (FIG. 6a) could be ascribed to the stretching bands of the C=O functionality derived from the carboxylic acid group, Y. Si and E. T. Samulski, Nano Lett., 8, 1679 (2008), thereby confirming the success of the acid functionalization protocol. It was noted that no distinctive peaks appeared for the pure LTO sample (FIG. 6b). In the APTES-LTO species (FIG. 6c), the characteristic peaks located at 1140 and 1030 cm-1 could be assigned to the Si—OH and Si—O—Si groups associated with the APTES linker, R. Villalonga, M. L. Villalonga, P. Diez, and J. M. Pingarron, J. Mater. Chem., 21, 12858 (2011), whereas the peaks localized at 3430 cm-1 and 1650 cm-1 were consistent with the N—H stretching and bending modes derived from the amine group, respectively. These data were indicative of the likely successful functionalization involving APTES.

Peaks situated at 1650 cm-1, 3406 cm-1, and 1577 cm-1 and associated within the LTO-MWNT composite derived from the covalent attachment method (FIG. 6e) likely corresponded to the C=O stretching bands in addition to the N—H stretching and bending modes from the amide group, respectively, all of which were suggestive of the probable formation of an amide bond between the MWNTs and the LTO micron-scale spheres. The 4-MBA coated LTO sample (FIG. 6d) gave rise to a sharp peak located at 1680 cm-1, corresponding to the stretching mode of the C=O bond associated with the 4-MBA linker. Peaks located at 1591 and 1425 cm-1 could be ascribed to the stretching mode of the phenyl ring derived from the linker, an observation consistent with a successful functionalization process. After attaching the MBA-coated LTO onto the MWNTs (FIG. 6f), the ring stretching peak shifted from 1425 cm-1 to 1398 cm-1, a result which was likely induced mainly by strong $\pi$-$\pi$ stacking interactions between the phenyl ring in the MBA linker and the conjugated MWNT network, and consequently, a "softening" of the C=C bonds, i.e. indicative of an expansion of C—C bonds. D.-Q. Yang, J.-F. Rochette, and E. Sacher, J. Phys. Chem. B, 109, 4481 (2005); Y. Zhang, S. Yuan, W. Zhou, J. Xu, and Y. Li, J. Nanosci. Nanotechnol., 7, 2366 (2007).

Electrochemical Properties of LTO-MWNT Composite Heterostructures: Cyclic Voltammetry—

Cyclic voltammetry (CV) of two electrode cells containing the LTO-MWNT heterostructures was collected at scan rates of 0.5, 1.0, 2.0, and 5.0 mV/s, as shown in FIGS. 7a, 7b, 7c and 7d. The voltammograms of the 5% in situ sample revealed reversible electrochemistry at all scan rates wherein clear anodic and cathodic peaks were apparent, as indicated in FIG. 7a. The A-Epeak values were 0.36, 0.36, 0.48, and 0.60 V at the scan rates of 0.5, 1.0, 2.0, and 5.0 mV/s, respectively. Under the slower scan rates of 0.5 and 1.0 mV/sec, two features were present for the anodic wave.

In data associated with the 'in situ' prepared sample, the reduction peak noted at 1.4 V can be attributed to the irreversible formation of the $LiTiO_2$ phase from the rutile $TiO_2$ phase, D. Wang, D. Choi, Z. Yang, V. V. Viswanathan, Z. Nie, C. Wang, Y. Song, J.-G. Zhang, and J. Liu, Chem. Mater., 20, 3435 (2008); 45. Y. Bai, Z. M. Liu, N. Q. Zhang, and K. N. Sun, RSC Adv., 5, 21285 (2015), as determined from refinement of the relevant XRD profile. At the highest scan rate of 5.0 mV/s, the cathodic wave showed distortion, leading to a broadening of the appearance of the peak. The 5% physically sonicated LTO-MWNT sample demonstrated A-Epeak values of 0.36, 0.44, 0.56, and 0.70 V at scan rates of 0.5, 1.0, 2.0, and 5.0 mV/s, respectively, as shown in FIG. 7b. The cathodic wave at the 5.0 mV/sec scan rate also gave rise to distortion, thereby leading to a broadening of the appearance of the peak.

The CV for the 5% covalent LTO-MWNT sample (FIG. 6c) depicts A-Epeak values which were 0.32, 0.44, 0.62, and 0.93 V at scan rates of 0.5, 1.0, 2.0, and 5.0 mV/s, respectively. The A-Epeak values for the covalently attached sample were comparable to the in situ and the sonicated samples measured at scan rates of 0.5 to 2.0 mV/s, yet these were higher at the scan rate of 5.0 mV/s. The CV peaks associated with the covalently attached composites are wider as compared with the other three preparative analogues, believed to be the result of the larger charge transfer resistance imparted by the presence of the APTES linkers.

By comparison, the LTO-MWNT composite prepared through $\pi$-$\pi$ interactions displayed A-Epeak values of 0.25, 0.35, 0.45, and 0.61 V at scan rates of 0.5, 1.0, 2.0, and 5.0 mV/s, respectively, as shown in FIG. 7d. The smallest A-Epeak values among all samples analyzed at each scan rate and therefore, the fastest kinetic behavior observed are noted with this LTO-MWNT composite, prepared with the MBA linker. It is also worth highlighting that this sample exhibited the best consistency among all of the variously prepared LTO-MWNT composites tested.

For all of the prepared samples, the anodic and cathodic peak current values were acquired and plotted versus the square root of the scan rate, as shown in FIGS. 8a and 8b, in order to determine (i) if the charge transfer kinetics were fast enough to obey the Randles-Sevcik equation, A. J. Bard and L. R. Faulkner, Electrochemical Methods: Fundamentals and Applications, Wiley, New York (2000), and equally significantly, (ii) the Li-ion diffusion coefficients of all of the samples analyzed. The sample prepared by the physical sonication method yielded correlation coefficients of 0.99 and 0.96 for the cathodic and anodic peak currents, respectively. The in situ sample gave rise to correlation coefficients of 0.99 and 0.98 for the cathodic and anodic peak currents, while the covalent sample highlighted correlation coefficients of 0.99 and 0.96 for the cathodic and anodic peak currents, respectively. The sample prepared through $\pi$-$\pi$ interactions generated coefficients of 0.99 for both the cathodic and anodic peak currents. These results indicate that the fastest kinetics among the four attachment modalities were exhibited by the LTO MWNT sample generated using $\pi$-$\pi$ interactions, a composite whose formation was mediated by the aromatic, conjugated 4-MBA linker.

Based upon the Randles-Sevcik equation shown below, the Li-ion diffusion coefficient can be calculated from the slope of the graph, obtained by plotting $i_p$ as a function of the square root of the scan rate.

$$i_p = 2.69 * 10^5 n^{3/2} A D_0^{1/2} C^*_0 v^{1/2}$$

The Li-ion diffusion coefficients are found to be $3.4 \times 10^{-8}$, $1.5 \times 10^{-7}$, $5.9 \times 10^{-8}$, and $2.3 \times 10^{-7}$ cm$^2$/s, for the samples derived from physical sonication, in-situ deposition, covalent attachment, and $\pi$-$\pi$: interactions, respectively. The sample prepared by $\pi$-$\pi$ interactions yielded a much higher diffusion coefficient as compared with the other sample types. Therefore, we can conclude that the diffusion coefficient and charge transfer are likely to be favorable for the $\pi$-$\pi$ interaction sample.

Galvanostatic Charge-Discharge Cycling and Rate Capability—

The electrochemical cells were tested in galvanostatic mode for both discharge and charge processes. The LTO-MWNT composite samples were subjected to a total of 105 discharge-charge cycles, including of three rounds of 35 cycles at discharge rates of C/2 (20 cycles), 20 C (5 cycles), 50 C (5 cycles), and 100 C (5 cycles). This testing provided the opportunity to assess both rate capability and capacity retention. Different strategies of integration with and attachment of MWNTs onto LTO were investigated on samples possessing 5% MWNT loading amounts, as shown in FIGS. 9a-d.

The capacity retention for the four as-generated LTO-MWNT composites was investigated. At cycles 20, 55, and 90, the capacities for the composite generated by the covalent method using the APTES linker were measured to be 148, 145, and 143 mAh/g, respectively, under a rate of C/2. The capacities for the composite synthesized by the in situ protocol were found to be 150, 150, and 149 mAh/g, while the capacities for the composite derived from the physical sonication technique were computed to be 161, 160, and 159 mAh/g, respectively. Notably, the capacities for the sample generated with the MBA linker were the highest of the samples tested; specifically, the data yielded values of 174, 171, and 170 mAh/g. Thus, the LTO-MWNT sample prepared using the covalent method exhibited a slightly poorer capacity retention of ~97% from cycles 20-90 as compared with the samples prepared via either physical sonication, in situ direct deposition, or π-π interaction methods, all of which yielded approximately 99% capacity retention from cycles 20-90.

At a rate of C/2, whereas the sample prepared by physical sonication yielded a capacity of 161 mAh g-1, the analogous LTO-MWNT 5 wt % composite fabricated by the π-π interaction protocol out-performed all of the other materials tested. In fact, this π-π interaction derived composite delivered a capacity of 175 mAh g-1, essentially achieving the expected theoretical capacity predicted for the LTO material. The differences among the measured capacities under the C/2 rate for the LTO-MWNT 5 wt % composites, synthesized by the in situ direct-deposition approach as well as by covalent attachment protocols were minimal, yielding 150 and 148 mAh/g, respectively.

The rate capability of the material samples was also assessed, as can be seen from FIGS. 7a-d. Under C/2 conditions, both the in situ prepared LTO-MWNT sample and the sample prepared via physical sonication demonstrated an abrupt voltage drop upon initial discharge to ~20 mAh/g, followed by a broad voltage plateau at ~1.55 V, as depicted in FIGS. 9a and 9b, respectively. The sample generated by the π-π interaction utilizing the MBA linker displayed a slightly more gradual voltage drop upon initial discharge, followed by the appearance of a long plateau at 1.55 V (FIG. 9d). The sample prepared using the covalent attachment with the APTES linker gave rise to a more gradually sloping voltage profile with higher voltages from 2.2-1.6 V out to 60 mAh/g, and followed by a plateau at approximately 1.55 V for the remainder of the discharge process, as shown in FIG. 9c. Even though the realized capacities for the four electrode types were similar under low rate discharge conditions, dissimilarities in the shapes of the voltage profiles became rather more apparent and pronounced at higher rates.

Under high rates of discharge, more significant differences were observed, wherein the highest delivered capacity was achieved by the samples prepared via the π-π interaction method. For example, under a 50 C discharge rate, these latter π-π interaction derived samples delivered 145 mAh/g, whereas the sonication-induced, in situ-derived, as well as covalently-generated samples only produced 90, 71, and 16 mAh/g, respectively. Notably, the covalently derived samples with the APTES linker had no functional capacity under a higher 100 C discharge rate, whereas the samples prepared by physical sonication, the in situ deposition method, and the π-π interaction protocols produced capacities of 15, 8, and 77 mAh/g at a similar 100 C discharge rate. Significantly, the sample derived from the π-π interaction protocol using the 4-MBA aromatic, conjugated linker gave rise to a capacity of 77 mAh/g with an extended plateau at about 1.16 V, thereby rendering it as the most promising high-rate LTO heterostructure.

Figure 10:
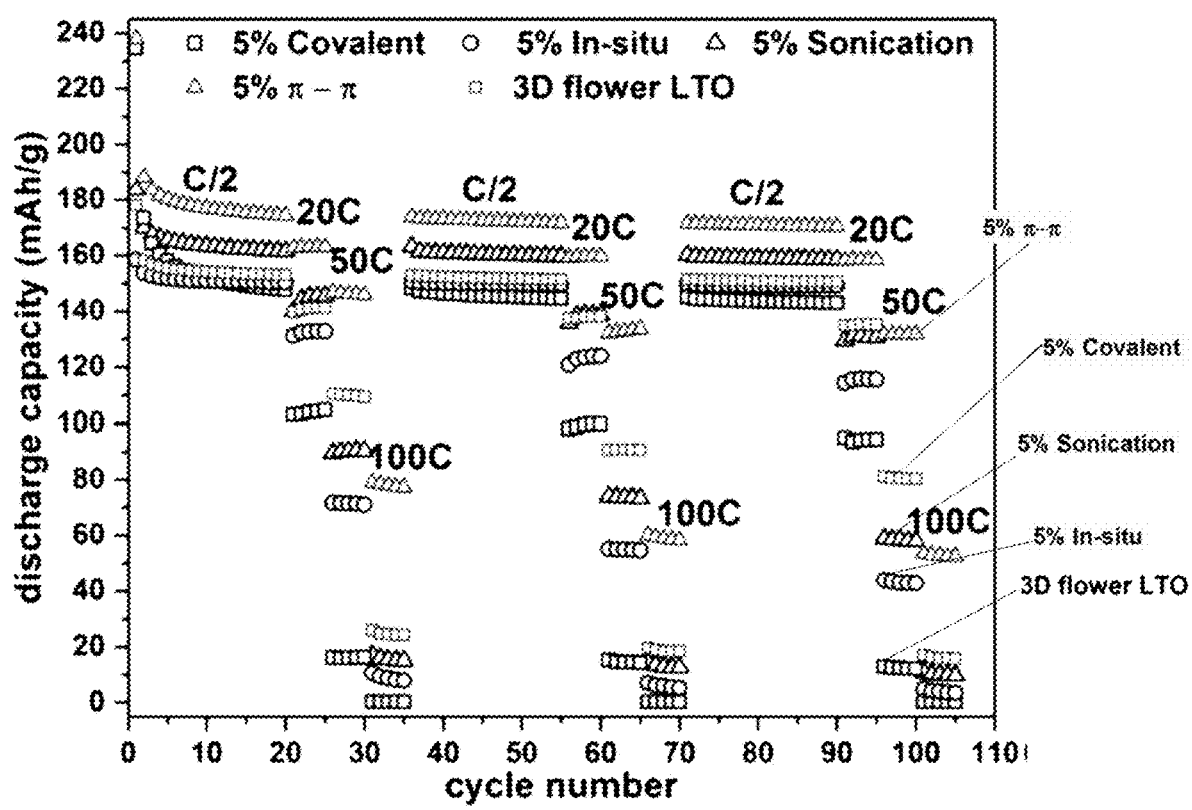
FIG. 10 depicts discharge capacity versus cycle number for lithium/LTO-MWNT electrochemical cells created with active material composites prepared using sonication (black triangles), covalent attachment (black squares), in situ deposition (black circles) and π-π interactions (blue triangles), respectively at a 5% MWNT loading level—the 3D flower LTO "control" sample (red squares) tested in the same program also is shown to effect comparison.

Under cycling, the samples prepared via the physical sonication method delivered 161, 145, 90, and 15 mAh/g, under discharge rates of C/2, 20 C, 50 C, and 100 C, at cycles 20, 25, 30, and 35, respectively, as depicted in FIG. 10. FIG. 10 depicts discharge capacity versus cycle number for lithium/LTO-MWNT electrochemical cells created with active material composites prepared using sonication, covalent attachment, in situ deposition and π-π interactions, respectively at a 5% MWNT loading level—the 3D flower LTO "control" sample tested in the same program also is shown to effect comparison.

By contrast, the 5% in situ LTO-MWNT material resulted in capacities of 150, 133, 71, and 8 mAh/g, while the sample prepared by the covalent method using the APTES linker gave rise to corresponding capacities of 148, 105, 16, and 0.15 mAh/g, respectively, through cycles 20, 25, 30, and 35. It is worth noting that the 'control' sample, i.e. the pure 3D flower LTO without any MWNT incorporation, yielded capacity values of 153, 141, 109, and 24 mAh/g, respectively, through cycles 20, 25, 30, and 35. The figures highlight that the sample prepared by physical sonication showed improvement at C/2 and 20 C discharge rates, but the samples derived from both in situ and covalent attachment strategies displayed lower capacity readings as compared with the pure LTO.

By contrast, the sample prepared from π-π interactions, using the aromatic, conjugated 4-MBA linker displayed outstanding performance by giving rise to capacity values of 174, 163, 146 and 77 mAh/g for cycles 20, 25, 30, and 35 respectively. By means of comparison with the 'control' sample itself, the sample with the aromatic, conjugated MBA linker delivered 37 mAh/g higher capacity than the pure, unmodified 3D flower LTO sample at a 50 C discharge rate and 53 mAh/g higher capacity at a 100 C discharge rate.

In all cases, the trend in the charge capacities reflected the corresponding changes in the discharge capacities measured under the same rate. These quantifiable differences are consistent with prior observations from the CV experiments. Indeed, (i) the high reversible capacity and the excellent cycling stability at C/2 coupled with (ii) the high discharge rates of 20 C and 50 C for the LTO-MWNT 5 wt % composites, generated by noncovalent π-π interactions using the aromatic, conjugated 4-MBA linker, are clearly superior to those of previously reported values associated with LTO-carbon nanotube composite motifs. A detailed comparison of our results in the context of the existing literature is presented.

Electrochemical Impedance Spectroscopy (EIS) Data—

Figure 11:
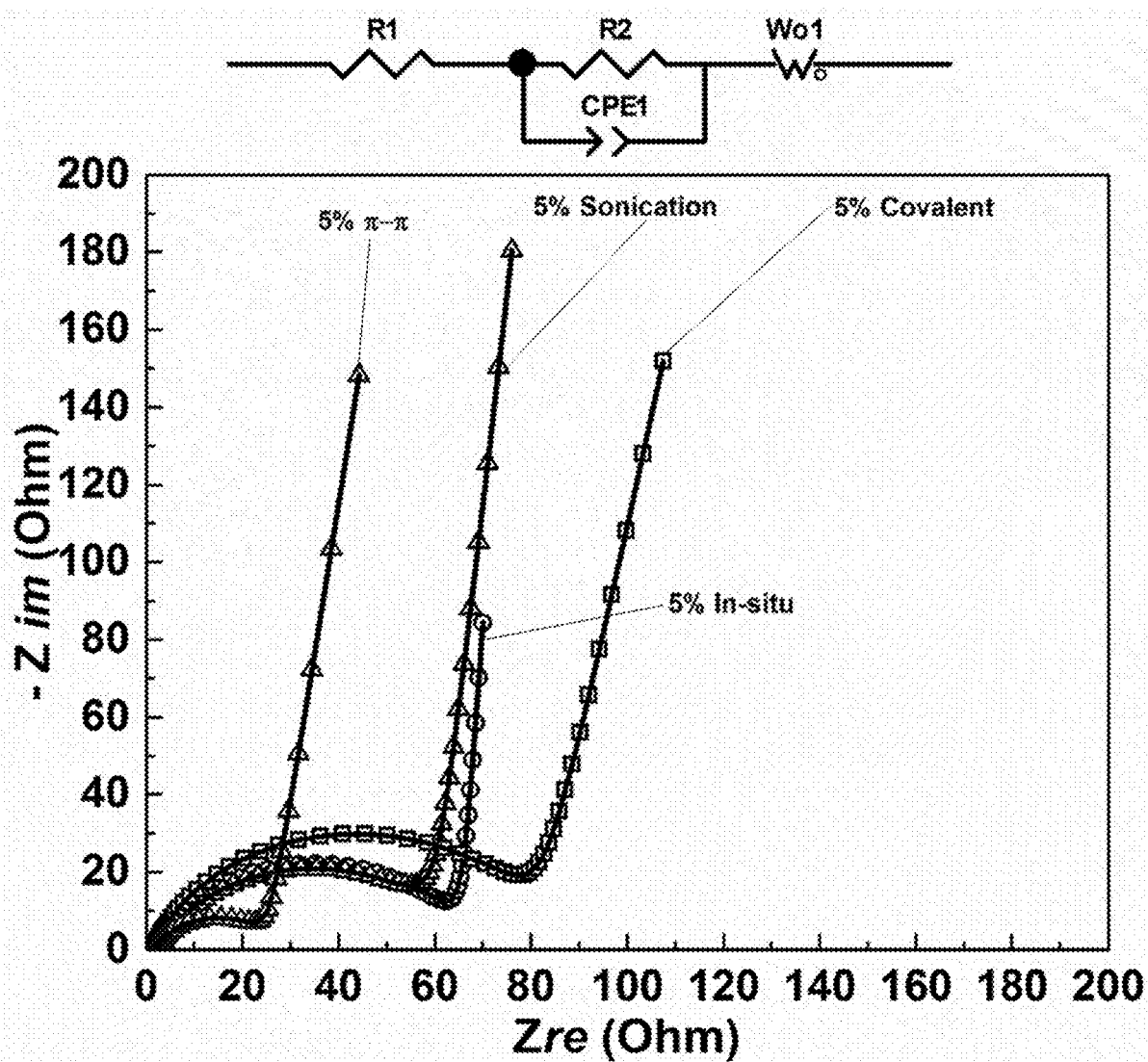
FIG. 11 depicts an equivalent circuit (top) and electrochemical impedance spectroscopy data (bottom) for lithium/LTO-MWNT electrochemical cells, incorporating active material composites fabricated using physical sonication (black triangles), covalent attachment (squares), in situ deposition (circles) and π-π interaction (blue triangle) protocols, respectively, at a 5% MWNT loading level.

Electrochemical impedance spectroscopy was used to compare the inherent resistance of the Li/LTO-MWNT cells with 5% MWNT loading, prepared using different modes of attachment, as shown in FIG. 11. The data were fit using an equivalent circuit, where R1 was attributed to ohmic resistance and R2 was ascribed to charge transfer resistance. The R1 values were consistent for all four cell types, with a range of 1.5-2.3 ohms. The R2 quantity, however, gave rise to more variation among the cells, with measured values of 52, 65, and 89 ohms noted for the cells prepared from LTO-MWNT samples associated with sonication, in situ deposition, and covalent attachment modalities, respectively.

The higher charge transfer resistance ascribed to the covalent attachment modality in particular was consistent with the poorer rate capability discussed above in the context of the voltammetry and galvanostatic testing results. Moreover, these results are consistent with a study, wherein covalent attachment of $Fe_3O_4$ onto a glassy carbon electrode surface using a 3-aminopropyltriethoxysilane (APTES) linker led to the observation of a higher charge transfer resistance as compared with a bare glassy carbon surface. H. S. Yin, Y. L. Zhou, T. Liu, T. T. Tang, S. Y. Ai, and L. S. Zhu, J. Solid State Electrochem., 16, 731 (2012).

To account for this behavior, we note that it has been reported that the presence of unwieldy, sterically bulky, and non-conjugated ligands can functionally act as an undesirable potential barrier which can thereby inhibit the degree of charge transport between adjacent nanoparticles and nanostructures. L. Wang, J. Han, B. Sundahl, S. Thornton, Y. Zhu, R. Zhou, C. Jaye, H. Liu, Z. Q. Li, G. T. Taylor, D. A. Fischer, J. Appenzeller, R. J. Harrison, and S. S. Wong, Nanoscale, 8, 15553 (2016); T. Virgili, I. S. Lopez, B. Vercelli, G. Angella, G. Zotti, J. Cabanillas-Gonzalez, D. Granados, L. Luer, R. Wannemacher, and F. Tassone, J. Phys. Chem. C, 116, 16259 (2012). An increased charge transfer resistance associated with the covalent attachment process using APTES would also account for not only the lower delivered capacity but also, due to increased polarization effects, the poorer capacity retention observed.

By contrast, the sample generated from the π-π interaction method using the aromatic, conjugated 4-MBA linker displayed only 24 ohms as an R2 value, indicating the most favorable charge transfer process occurring among all of the LTO-MWNT composites tested. This finding moreover corroborates previous published results which suggest that electron-rich, conjugated systems are more efficacious at enabling the charge transfer process as compared with their non-conjugated counterparts. L. Wang, J. Han, B. Sundahl, S. Thornton, Y. Zhu, R. Zhou, C. Jaye, H. Liu, Z. Q. Li, G. T. Taylor, D. A. Fischer, J. Appenzeller, R. J. Harrison, and S. S. Wong, Nanoscale, 8, 15553 (2016).

The inventors have correlated the electrochemical performance of these composite materials with their corresponding attachment chemistry. For example, in this study, the LTO sample with the 5% MWNT loading prepared via the π-π interaction method evidenced the highest delivered discharge capacity at every C rate from C/2 to 100C with the most notable differences apparent under discharge rates ≥20 C, due to a much lower charge transfer resistance as compared with those of the other LTO-MWNT composites analyzed. It is worth further mentioning that these LTO-MWNT composites, produced by π-π interactions, exhibited a reproducibly high rate capability and a desirable cycling stability, i.e. delivering 174 mAh g-1 at C/2 with a 99% capacity retention from cycles 20-90, 163 mAh g-1 at 20 C with a 97% capacity retention from cycles 25-95, and 146 mAh/g at 50 C with a 90% capacity retention from cycles 30-100.

These values denote clearly superior performance to those of any previously reported LTO-carbon nanotube composite materials, to date, especially under these relatively low loading conditions. Notably, the LTO-MWNT samples prepared via the covalent attachment scheme delivered a lower capacity and displayed 97% capacity retention from cycle 20 to cycle 90 at C/2 rate as compared with the higher capacity and 99% capacity retention for the set of physically sonicated, in situ, and π-π interaction samples. The voltammetric and galvanostatic data coupled with the impedance results indicate slower kinetics for the LTO-MWNT heterostructures, prepared using the covalent attachment approach, denoting data consistent with a prior report on a totally different system wherein increased charge transfer resistance was found to have been associated with a covalent coupling protocol involving the 3-aminopropyltriethoxysilane (APTES) linker. H. S. Yin, Y. L. Zhou, T. Liu, T. T. Tang, S. Y. Ai, and L. S. Zhu, J. Solid State Electrochem., 16, 731 (2012).

The inventive fabrication method's use of deliberative processing protocols in order to tune and control fundamental anode material properties and realize truly favorable cycling performance coupled with the high discharge capacity detected, highlighting distinctive advantages for the hierarchical architectures from a battery perspective.

While the invention has been shown and described with reference to certain embodiments of the present invention thereof, it will be understood by those skilled in the art that various changes in from and details may be made therein without departing from the spirit and scope of the present invention and equivalents thereof.

What is claimed is:

1. A method of fabricating nanocomposite anode material comprising lithium titanate (LTO)-multi-walled carbon nanotube (MWNT) composite structures intended for use in a lithium-ion battery, the method comprising:
   providing multi-walled carbon nanotubes (MWNTs) having surfaces, onto which functional oxygenated carboxylic acid moieties are arranged;
   generating 3D flower-like, lithium titanate (LTO) microspheres having constituent nanosheets within the flower-like lithium titanate (LTO) microspheres; and
   anchoring the acid-functionalized MWNTs onto surfaces of the 3D LTO flower-like LTO microspheres by π-π interaction strategy to realize the nanocomposite anode material;
   wherein the 3D LTO flower-like microspheres are anchored to the acid-functionalized MWNTs by π-π interaction by first dispersing the 3D LTO flower-like microspheres in an ethanolic solution of 4-mercaptobenzoic acid (4-MBA) linker molecules.

2. The method of claim 1, wherein generating the 3D flower-like, lithium titanate (LTO) microspheres includes synthesizing thin, saw-tooth shaped constituent nanosheets of lithium titanate (LTO) and subjecting the saw-tooth shaped constituent nanosheets to a calcination process in air, at a temperature range of between 400 and 600 degrees Centigrade, for a limited time period, to realize the nanocomposite anode material.

3. The method of claim 2, wherein the limited time period is in a range of about 1 to about 5 hours.

4. The method of claim 3, wherein the calcination process in air, occurs at a temperature of about 500 degrees Centigrade, for a limited time period of about 3 hours.

5. The method of claim 1, wherein the ethanolic solution of 4-mercaptobenzoic acid (4-MBA) linker molecules and 3D LTO flower-like microspheres is stirred to yield 4-MBA functionalized 3D LTO flower-like microspheres in which terminal carboxylic acid groups of the ligand are bound onto Ti sites localized on the 3D LTO flower-like microsphere surfaces by either a monodentate or bidentate coordination mode, to realize molecular-coated LTO product.

6. The method of claim 5, further including isolating the molecular-coated LTO product by vacuum filtration to remove any unbound 4-MBA linkers and then reacting the molecular-coated LTO product with oxidized MWNTs.

7. The method of claim 6, wherein the reacting includes sonicating the molecular-coated LTO product in a mixture of ethanol and DMSO solvents to stabilize 7C-7C interactions between phenyl rings within aromatic, conjugated linker molecules and an underlying network comprising the oxidized MWNTs.

8. The method of claim 1, wherein the providing includes acid-functionalizing the MWNTs, and dispersing the acid-functionalized MWNTs in dimethyl sulfoxide (DMSO) by ultrasonication.

9. The method of claim 1, wherein the 3D LTO microspheres comprise nanosheets that provide for shortened Li-ion diffusion distances and enhanced contact area with electrolyte, when used in a Li-ion battery.

10. The method of claim 9, wherein the nanosheets are saw-tooth shaped, which are formed using a hydrothermal process.

11. The method of claim 1, wherein the MWNTs are fabricated by dispersing pristine MWTNs in a solution of HNO3 by sonication and refluxing to remove any remnant catalysts and carbonaceous impurities and generate the functional, oxygenated carboxylic moieties onto nanotube surfaces of the MWTNs.

12. The method of claim 11, wherein the HNO3 concentration is 70% by weight.

* * * * *